June 9, 1964

R. V. DUNKLE ETAL 3,136,674

METHOD OF MAKING ELECTROMAGNETIC WAVE REFLECTOR

Filed Dec. 9, 1959

JOSEPH T. GIER
ROBERT V. DUNKLE
ROBERT D. RODDICK
INVENTORS

BY
Flehr and Swain
ATTORNEYS

June 9, 1964  R. V. DUNKLE ETAL  3,136,674
METHOD OF MAKING ELECTROMAGNETIC WAVE REFLECTOR
Filed Dec. 9, 1959  3 Sheets-Sheet 2

JOSEPH T. GIER
ROBERT V. DUNKLE
ROBERT D. RODDICK
*INVENTORS*

BY

*Lehr and Swain*
ATTORNEYS

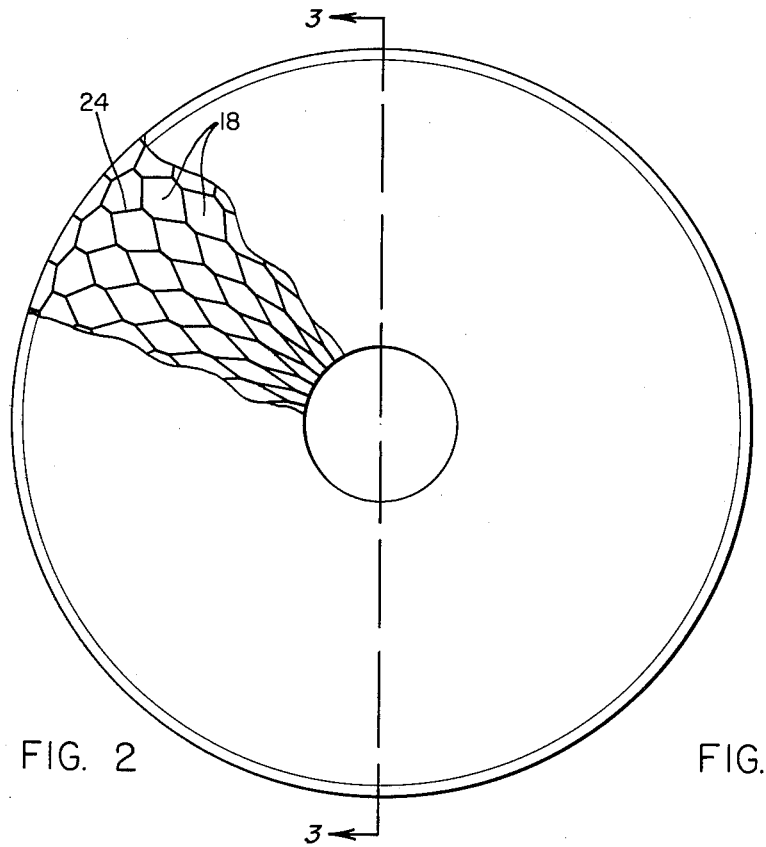
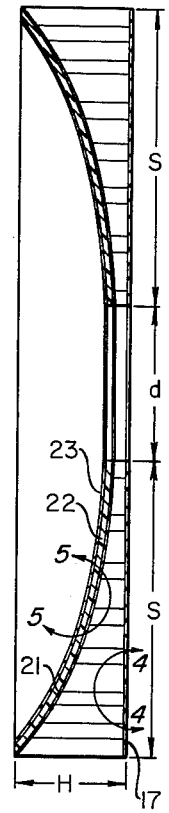
FIG. 2  FIG. 3
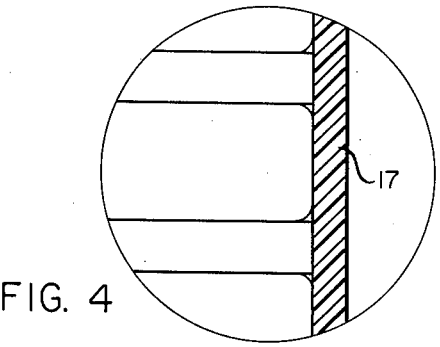
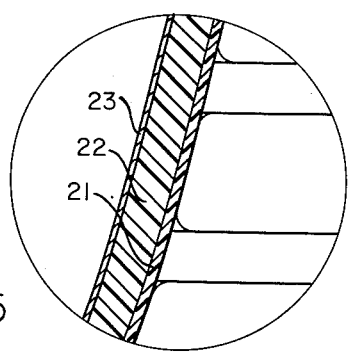
FIG. 4  FIG. 5
JOSEPH T. GIER
ROBERT V. DUNKLE
ROBERT D. RODDICK
INVENTORS United States Patent Office 3,136,674
Patented June 9, 1964

3,136,674
METHOD OF MAKING ELECTROMAGNETIC
WAVE REFLECTOR
Robert V. Dunkle, Rte. 2, Box 235B, Fallbrook, Calif.;
Joseph T. Gier, 2942 S. Bronson, Los Angeles, Calif;
and Robert D. Roddick, 11615½ Culver Blvd., Los
Angeles 66, Calif.
Filed Dec. 9, 1959, Ser. No. 858,355
3 Claims. (Cl. 156—197)

This invention relates generally to a reflector for electromagnetic waves, for example, solar energy and radio waves, and to a method of making the same.

In the prior art, reflectors of the above character have been formed by three dimensional operations such as machining, casting and the like. In general, the reflectors are relatively heavy requiring reinforced structures for supporting and scanning the same.

It is a general object of the present invention to provide an improved reflector and method of making the same.

It is another object of the present invention to provide a rigid reflector which is relatively light.

It is another object of the present invention to provide an electromagnetic wave reflector and method in which the contour is established by a two dimensional machine operation.

It is a further object of the present invention to provide a cellular electromagnetic wave reflector.

These and other objects of the invention will become more clearly apparent from the following description when taken in conjunction with the accompanying drawing.

Referring to the drawing:

FIGURE 2 is a plan view partly in section showing a reflector in accordance with the invention;

FIGURE 3 shows a view taken along the line 3—3 of FIGURE 2;

FIGURE 4 shows an enlarged view of the portion 4—4 of FIGURE 3; and

FIGURE 5 shows an enlarged view of the portion 5—5 of FIGURE 3.

Expansible cellular material such as the material generally known as "honeycomb material" is employed in forming reflecting structures in accordance with the invention. Expansible material of this type may be made from paper, aluminum, Fiberglas, stainless steel, cloth and other materials. In accordance with the present invention, a two dimension machine operation is carried out when the material is compressed and the material is then expanded to form a reflector.

Referring to FIGURE 1, a compressed segment 11 of expansible material having ends of length L, sides of length S, and a height H is illustrated. The material is expansible in a direction parallel to the ends as indicated by the arrows 12. Thus, as the material is expanded, the length of the ends increases until the material is fully expanded.

The first step in forming a reflector in accordance with the present invention is to take a compressed segment 11 of expansible material and machine the same on a plane normal to the H-S plane to form a surface of desired configuration. The surface configuration is such that when the material is expanded, as will hereinafter be described, the surface of revolution defined will have the desired contour. The machine operation may comprise sawing, turning, grinding, or any other operation suitable for removing material and forming a surface with desired configuration.

Figure 1A:
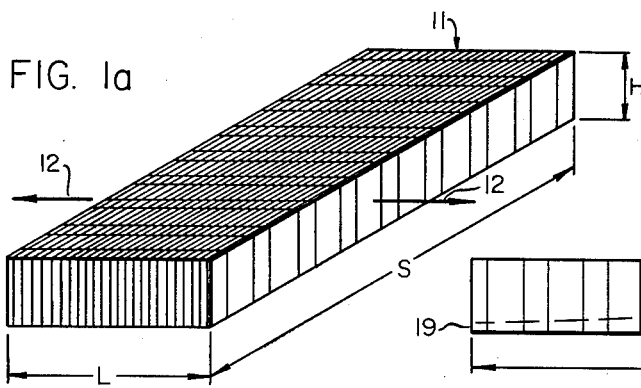
FIGURE 1 shows the steps in forming a reflector in accordance with the present invention.
Figure 1B:
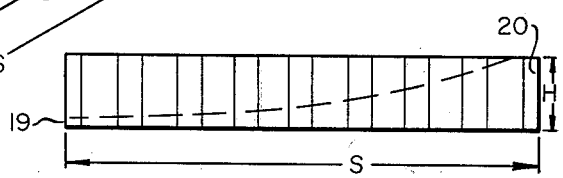
Figure 1C:
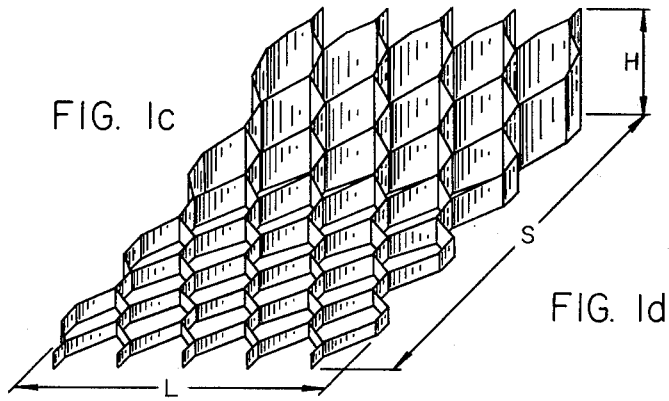

It may be desirable to expand the segment, as indicated in FIGURE 1c. It is believed that this makes the segment easier to work in the ensuing operations.

Figure 1D:
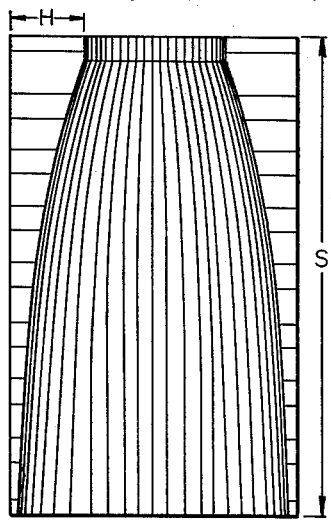

The next step is to form the desired surface of revolution. One method is to shape the segment in the form of a cylinder until the H-S planes touch and to secure one to the other by a suitable bonding material, for example, glue, cement, or the like. A member having cylindrical outer walls is formed as illustrated in FIGURE 1d. The cylinder has one end placed over an expansion cone 14 and the other end is expanded downwardly as indicated by the arrows 16 until the outer surface contacts the mat 17. Thus, the cylinder is expanded radially about the cone until the L-S surface lies on a horizontal surface which is covered by the suitable matting material. The outer circumference of the cone should be equal to or greater than the length L. It is seen that the upper surface is a surface of revolution defined by the ends of the cells 18 (FIGURE 1f).

Figure 1E:
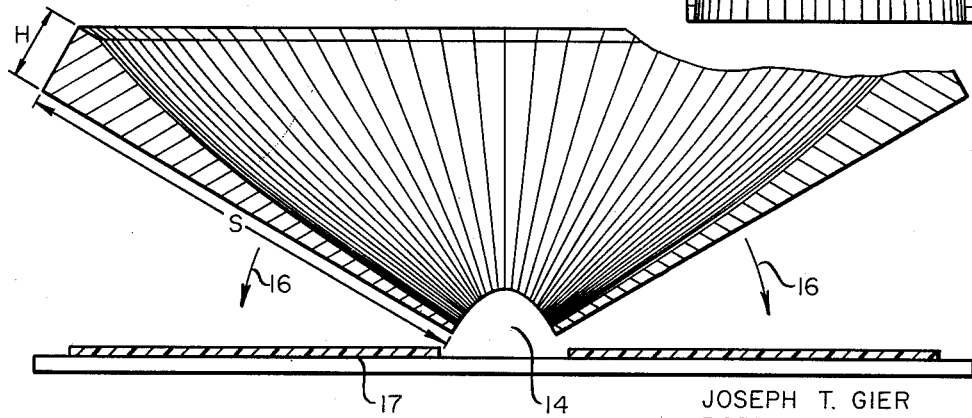
Figure 1F:
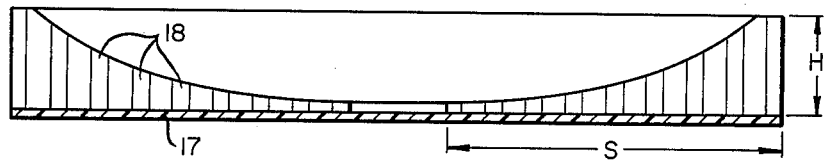

A bonding material may then be applied between the matting material and the lower end of the cells to bond the end of the cells to the mat (FIGURE 1f). This material may be reinforcing material such as an epoxy, resin or polyresin to form a solid lower surface which serves to rigidly support the reflector. However, glue, cement or other suitable bonding material may be employed to bond the ends to the lower surface 17 which may be a supporting surface such as a metal plate or the like.

The steps shown in FIGURES 1d and 1e may be performed by employing a suitable mandrel for abutting one end 19, FIGURE 1b, and then expanding the other to form a circle. The H-S planes are then joined.

Figure 1G:
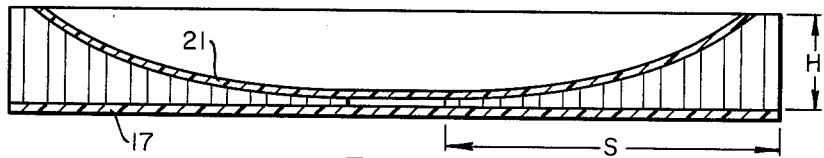

A metal reflector which has been expanded as described above is shown in FIGURE 1f. If the expansible material is metal, the reflector can be used for radio purposes. However, in certain instances, it may be desirable to form a continous upper surface. In such instances, a preshaped mat 21 may be applied to the surface or a mat may be formed on the upper surface (FIGURE 1g). Suitable bonding material may then be applied to bond the mat to the upper ends of the cells 18.

Figure 1H:
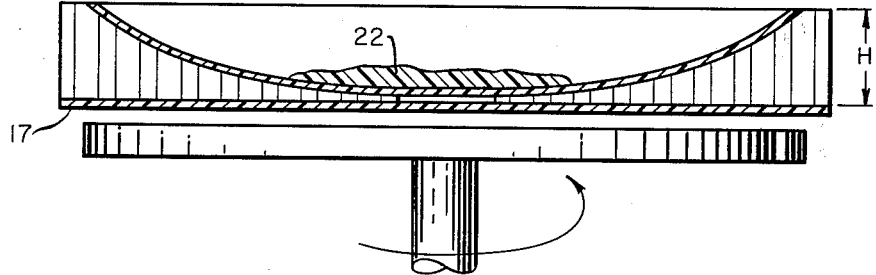

To form a smooth surface, material may be spun onto the mat. Thus, a casting or bonding material 22 may be applied in the center as shown in FIGURE 1h and the complete assembly spun to throw the bonding material outwardly along the surface by centrifugal force. If a relatively large amount of material is applied, the inner surface will achieve a parabolic configuration. It is well known that the surface of a fluid rotating in an open cylinder is parabolic. The focal length of the parabola formed may be controlled by controlling the rotational velocity.

Figure 1I:
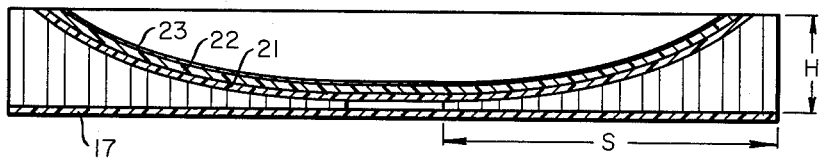

The surface may then be metallized 23, FIGURE 1i as, for example, by vacuum evaporating metals on the surface, chemical deposition, electroplating materials, spraying, painting, or applying prepared films. An electromagnetic wave reflector is then formed.

Referring to FIGURE 2, a plan view, partly in section, of a reflector formed in accordance with the invention is illustrated. The material forming the reflector is honeycomb material 24. It is observed that the expansion of the cells 18 increases radially outwardly. The cells at any given radius are of substantially equal size.

Referring to FIGURE 3, a sectional view taken along the line 3—3 of FIGURE 2 is illustrated showing the lower supporting surface 17, the upper bonding surface 21, a casting material 22, and an upper reflecting surface 23. This is more clearly illustrated in the enlarged views of FIGURES 4 and 5. For example, the lower surface 17 may be impregnated glass cloth; the upper surface 21 may likewise be impregnated Fiberglas; the surface 22 may be epoxy resin and the surface 23 may be aluminum.

It is observed that each of the cells will have sealed therein air at atmospheric pressure. In certain instances, changes in pressure may cause difficulty. Thus, the lower mat may be porous, or each of the cells filled with suitable filler material, or the individual cell walls may be perforated to provide a path for expansion of enclosed gases. Drilling holes normal to H-S planes before expansion would provide the above path to the atmosphere.

The complete reflector may then be mounted on a suitable base plate carried by a structure which is adapted to scan the same. The reflector is rigid, light in construction, inexpensive to manufacture, and can easily be made in any desired shape and size.

We claim:

1. The method of forming a radiant energy reflector which comprises the steps of machining a surface of compressed honeycomb material to form a compressed segment having thin and thick ends with a gradual line of inclination extending from said thin end to said thick end, expanding said machined material, cementing the sides of said thick and thin ends to each other to form a hollow cylinder, placing one end of said cylinder over an expansion cone of generally conical configuration and expanding the opposite end outwardly and downwardly to convert the interior surface of said cylinder to an exterior surface.

2. The method of forming a reflector according to claim 1 including the additional steps of overlying said converted exterior surface with a layer of supporting material, depositing fluid coating material substantially centrally thereof and spinning said reflector to distribute said deposit of coating material by centrifugal forces across said supporting material.

3. The method of forming a reflector according to claim 2 further including the step of applying a rigid backing to the other surface of said reflector.

References Cited in the file of this patent

UNITED STATES PATENTS

| | | |
|---|---|---|
| 1,860,158 | Peterson | May 24, 1932 |
| 2,301,580 | Press | Nov. 10, 1942 |
| 2,423,648 | Hansell | July 8, 1947 |
| 2,636,125 | Southworth | Apr. 21, 1953 |
| 2,668,327 | Steele | Feb. 9, 1954 |
| 2,742,387 | Giuliani | Apr. 17, 1956 |
| 2,805,974 | Brucker | Sept. 10, 1957 |
| 2,855,664 | Griffith et al. | Oct. 14, 1958 |
| 2,910,396 | Randall et al. | Oct. 27, 1959 |

OTHER REFERENCES

"Thermoplastic Honeycombs," May, Plastics (London), vol. 16, November 1951, pp. 305–307.